United States Patent
Roitman et al.

(10) Patent No.: US 8,197,723 B2
(45) Date of Patent: Jun. 12, 2012

(54) CURABLE RESINS AND ARTICLES MADE THEREFROM

(75) Inventors: Daniel Roitman, Menlo Park, CA (US); Dileep Goyal, San Jose, CA (US)

(73) Assignee: DigitalOptics Corporation East, Charlotte, NC (US)

( * ) Notice: Subject to any disclaimer, the term of this patent is extended or adjusted under 35 U.S.C. 154(b) by 0 days.

(21) Appl. No.: 12/813,686

(22) Filed: Jun. 11, 2010

(65) Prior Publication Data

US 2010/0314591 A1 Dec. 16, 2010

Related U.S. Application Data

(60) Provisional application No. 61/268,488, filed on Jun. 12, 2009.

(51) Int. Cl.
*F21V 9/04* (2006.01)
*F21V 9/06* (2006.01)
*G02B 5/22* (2006.01)
*G02B 5/26* (2006.01)

(52) U.S. Cl. ............... 252/589; 428/413; 428/423.1; 428/500; 523/212; 524/548; 524/560; 524/588

(58) Field of Classification Search ............ 252/589; 524/548, 560, 588; 428/413, 423.1, 500; 523/212

See application file for complete search history.

(56) References Cited

U.S. PATENT DOCUMENTS

2004/0137368 A1 7/2004 Steinmann
2006/0251901 A1 * 11/2006 Armstrong et al. ........... 428/413

FOREIGN PATENT DOCUMENTS

| DE | 2635691 A1 | 2/1978 |
|---|---|---|
| DE | 2730370 A1 | 1/1979 |
| EP | 1909118 A1 | 4/2008 |
| EP | 2067810 A1 | 6/2009 |
| JP | 61159408 A | 7/1986 |
| JP | 2213801 A | 8/1990 |
| JP | 2008-308589 A | 12/2008 |
| WO | 2008/127930 A1 | 10/2008 |

OTHER PUBLICATIONS

International Search Report and Wriitten Opinion from PCT/US2010/038251 dated Jan. 26, 2011.
Communication from PCT/US20101038251 dated Jul. 28, 2010.

* cited by examiner

*Primary Examiner* — Harold Pyon
*Assistant Examiner* — Bijan Ahvazi
(74) *Attorney, Agent, or Firm* — Lerner, David, Littenberg, Krumholz & Mentlik LLP

(57) ABSTRACT

Optical devices of excellent optical and physical properties produced from cured resins are disclosed. The resins and/or the cured hybrid polymer material made with the resins are characterized by a high level of cycloaliphatic-containing groups. Specific additives that can participate in crosslinking the curable polysiloxane provide additional physical property advantages.

1 Claim, No Drawings

CURABLE RESINS AND ARTICLES MADE THEREFROM

CROSS-REFERENCE TO RELATED APPLICATIONS

This application claims the benefit of the filing date of U.S. Provisional Patent Application No. 61/268,488 filed Jun. 12, 2009, the disclosure of which is hereby incorporated herein by reference.

BACKGROUND OF THE INVENTION

Known materials are often incapable of satisfactorily balancing the many requirements necessary for use as optical devices. Indeed, the often competing criteria for successful optical polymers are numerous and include: (1) material must have a high transparency with little or no yellowing (greater than 90% transmission between 400 nanometers and 700 nanometers); (2) low cure shrinkage (less than 4% and in other embodiments, less than 2% linear shrinkage); (3) low "reflow" shrinkage also known as low post thermal shrinkage (less than 2% linear shrinkage upon temperature excursion between room temperature and up to 280° C., in another embodiment, less than 1% linear shrinkage under these conditions); (4) high fracture toughness (not brittle or crumbly >1.0 MPa); (5) high refractive index (greater than 1.47, and in another embodiment, greater than 1.49); (6) low dispersion (a relatively high "Abbe" number $V_d$—greater than and in another embodiment greater than 53); (7) ease of release from a mold; (8) good adhesion to substrates (typically quartz, glass or $SiO_2$, which can be further optimized with additives); (9) low coefficient of thermal expansion (CTE of 120 ppm/°C., and in another embodiment less than 80 ppm/° C.); (10) a low change of refractive index with temperature (dn/dT of less than $100 \times 10^{-6}$ RIU/° C.); and (11) must pass thermal shock (100 cycles of –40° C. to 85° C. over 2.5 minutes (i.e., 50° C./min)) without cracking or delamination and with less than 1% shrinkage. Perhaps the most difficult of these to meet are the requirements of low cure shrinkage, low dispersion, high refractive index, and high fracture toughness.

Epoxycyclohexyl-siloxane hybrid resins have been previously proposed by Crivello and others (see for example Crivello et al. Chemistry of Materials (2001) vol. 13, p. 1932). Their main advantage is their low cure shrinkage, and high transparency. While some resins based on 100% (epoxycyclohexyl)ethyltrimethoxysilane (ECHETMS) manufactured by Polyset, have Abbe number values or $V_d$ near 56 or higher and refractive indexes of 1.5 or higher, the cured ECHETMS resin exhibit practically no glass transition and low fracture toughness (brittleness). This leads to cracking and breaking when films or other fabricated parts (optical devices) supported on glass substrates undergo thermal annealing (to between room temperature and 130° C.), reflow, or thermal shock. Overcoming low fracture toughness of cationic epoxycyclohexyl-based resins in general, and ECHETMS-based resins in particular, is a challenging issue that has received considerable attention in the published literature.

See Wu, et al., "*Siloxane modified cycloaliphatic epoxide UV coatings,*" 36 Progress in Organic Coatings (1999) 89-101, which teaches modification of cycloaliphatic epoxide/caprolactone polyol coatings with siloxane polyols. See Dworak & Soucek, "*Synthesis of cycloaliphatic substituted silane monomers and polysiloxanes for photocuring,*" 37 Macromolecules (2004) 9402-17, which describes photocurable materials including cycloaliphatic epoxide terminated poly(dimethylsiloxane-CO-methylhydrosiloxane and hydridefunctionalilzed poly(dicycloaliphatic siloxane-CO-cycloaliphatic hydroxiloxane). See also Soucke et al., "*A new class of silicone resins for coatings,*" 4 J. Coat Techn. Res. Vol. 3 (2007) 263-74.

BRIEF SUMMARY OF THE INVENTION

In one aspect, the invention provides a photocurable and/or thermally curable resin ("PT curable resin") of excellent optical properties capable of being used for producing optical devices or coatings for optical devices having a high refractive index of greater than 1.48 and optical dispersion, as measured by Abbe number, of greater than 45. In another aspect of the invention, there is provided a PT curable resin having excellent optical properties capable of being used for producing optical devices or coatings for optical devices having a high refractive index of greater than 1.49 and an Abbe number of greater than 53. Optical devices produced from these PT curable resins or coatings for optical devices comprising these PT curable resins are also contemplated.

Another aspect of the invention is a method of providing fracture toughness and durability to a PT curable resin of excellent optical properties without unduly compromising those optical properties comprising curing a PT curable resin with an effective amount of at least two additives selected from the group consisting of hydroxyoxetanes, diglycidyl ethers, alcohols and divinyl ethers, and in one particular embodiment, hydroxyoxetane and a glycidyl ether are used to produce a crosslinked solid hybrid polymer material. Optical devices and coatings for optical devices made using this method are also contemplated.

In still another aspect of the invention, there is provided a crosslinked solid hybrid polymer material produced from a mixture of PT curable resin, at least two additives selected from the group consisting of hydroxyoxetanes, diglycidyl ethers, alcohols and divinyl ethers, and in one particular embodiment, hydroxyoxetane and a glycidyl ether. The resulting solid hybrid polymer material has excellent optical properties, rendering it useful and capable of being used for producing optical devices or coatings for optical devices having a high refractive index of greater than 1.48, an Abbe number of greater than 45, a low cure shrinkage of less than 3%, and high fracture toughness. Optical devices produced from this material and coatings produced for use on optical devices made from this material are also contemplated.

In yet another aspect of the invention, there is provided a cured solid hybrid polymer of excellent optical properties having a refractive index greater than 1.49, an Abbe number greater than 53, low cure shrinkage (less than 2% linear shrinkage), and high fracture toughness.

At least some of the PT curable resins described herein can be reacted with up to about 40% of a mixture of at least two of a hydroxyoxetane, a glycidyl ether, a divinyl ether and/or an alcohol to form a cured solid hybrid polymer having a refractive index of 1.48 or more, an Abbe number of 45 or more, and sufficient fracture toughness. Optical devices and coatings for optical devices made from these materials are also contemplated.

DETAILED DESCRIPTION

While the specification concludes with the claims particularly pointing and distinctly claiming the invention, it is believed that the present invention will be better understood from the following description. All percentages and ratios used herein are by weight of the total composition and all measurements made are at 25° C. and normal pressure unless otherwise designated. All temperatures are in Degrees Celsius unless specified otherwise. The present invention can comprise (open ended) or consist essentially of the components of the present invention as well as other ingredients or elements described herein. As used herein, "comprising" means the elements recited, or their equivalent in structure or function, plus any other element or elements which are not recited. The terms "having" and "including" are also to be construed as open ended unless the context suggests otherwise. As used herein, "consisting essentially of" means that the invention may include ingredients in addition to those recited in the claim, but only if the additional ingredients do not materially alter the basic and novel characteristics of the claimed invention. Preferably, such additives will not be present at all or only in trace amounts. However, it may be possible to include up to about 10% by weight of materials that could materially alter the basic and novel characteristics of the invention as long as the utility of the compounds (as opposed to the degree of utility) is maintained. All ranges recited herein include the endpoints, including those that recite a range "between" two values. Terms such as "about," "generally," "substantially," and the like are to be construed as modifying a term or value such that it is not an absolute, but does not read on the prior art. Such terms will be defined by the circumstances and the terms that they modify as those terms are understood by those of skill in the art. This includes, at very least, the degree of expected experimental error, technique error and instrument error for a given technique used to measure a value.

Note that while the specification and claims may refer to a final product such as, for example, a poly(meth)acrylate or polysiloxane containing a particular monomer or a particular distribution of monomers, it may be difficult to tell from the final product that the recitation is satisfied. However, such a recitation may be satisfied if the materials used prior to final production meet that recitation. Indeed, as to the identity of any component or the presence of any property or characteristic of a final product which cannot be ascertained directly, it is sufficient if that component or property resides in an earlier production step.

"Optical devices" as used herein include lenses, waveguides, and diffractive optical components. Optical devices may be produced using any conventional process.

It has been surprisingly discovered that the use of cycloaliphatic groups in the resins of the invention leads to an increase in both the refractive index and the Abbe number. This trend is opposite to that which is seen with most materials, in which an increase in refractive index is generally accompanied by a decrease in the Abbe number (i.e., an increase in optical dispersion).

Without wishing to be bound by any theory of operation, it is believed that this unexpected trend is associated with the fact that cyclic compounds absorb at wavelengths that are also "blue-shifted" relative to their linear or branched homologues. These structures serve to blue-shift the edge of absorbance to shorter wavelengths, and thus, to reduce the optical dispersion of UV-cured resins in the visible range of the spectrum.

In embodiments of the present invention, these results are achieved in two ways. First, by the incorporation of at least about 50% of cycloaliphatic group-containing monomers into the resins. Second, by the reaction of at least two additives selected from the group consisting of a hydroxyoxetane, a glycidyl ether, divinyl ether, and alcohols, and in one particular embodiment, both a hydroxyoxetane and a diglycidyl ether, with resins to form a crosslinked (or cured—used interchangeably) solid hybrid polymer.

The use of about 50% or more of cyclic aliphatic group-containing monomers in the PT curable resin, and/or the use of cycloaliphatic-containing additives, to raise the total cycloaliphatic content of the cured solid hybrid polymer, not only results in good physical properties, but also very desirable optical properties. The addition of selected additives, and in one embodiment a hydroxyethyl oxetane reagent and a glycidyl ether, such as glycidyl-capped poly-dimethylsiloxane (Gelest DMS-E09), to the PT curable resin, followed by curing to form a solid hybrid polymer, provides the necessary additional fracture toughness/high cohesive strength missing from, e.g., optically known ECHETMS-based polysiloxane polymers, without impacting the excellent optical properties of the PT curable resin to a degree which prevents them from being used. Optical devices produced from this material and coatings produced for use on optical devices made from this material are also contemplated.

As used herein, "cycloaliphatic group" means a cyclic group that is not aromatic. Cycloaliphatic groups include monocylic and polycylic groups. Typically, the cycloaliphatic group contains from 3 to 15 carbon atoms, in embodiments from 4 to 12 carbon atoms, and in another embodiment from 5 to 10 carbon atoms. In one embodiment of the present invention the cycloaliphatic group is a polycyclic group.

The basic ring structure of the cycloaliphatic group is not restricted to groups formed solely from carbon and hydrogen (hydrocarbon groups), although a hydrocarbon group is preferred. Furthermore, the hydrocarbon group may be either saturated or unsaturated, but is preferably saturated.

In embodiments of the present invention, the basic ring structure of the cycloaliphatic group may include a hetero atom, such as O, S, or F. In one embodiment, the basic ring structure of the cycloaliphatic group includes an oxygen atom in ether form (i.e., R—O—R).

Examples of cycloaliphatic groups include monocycloalkanes, such as cyclopentyl and cyclohexyl, and polycycloalkanes, such as adamantyl, norbornyl, di-norbornyl, isobornyl, tricyclodecanyl, tetracyclododecanyl, or diamondoid derivatives.

| Name | Structure |
|---|---|
| Cyclopentyl | |
| Cyclohexyl | |
| Adamantyl | |
| Norbornyl | |
| Di-norboryl | |

| Name | Structure |
|---|---|
| Isobornyl | |
| Tricyclodecanyl | |

Exemplary cycloaliphatic groups (the side alkyl groups shown in the structures above represent possible attachment points).

The cycloaliphatic groups may be incorporated into the backbone of the resin or may be found as a side-chain on the monomer(s) polymerized to form the resin, or both. In addition, as described below, additives to the resins may contain cycloaliphatic groups, as well.

The photocurable and/or thermally curable resins ("PT curable resins") useful in the present invention are any photocurable and/or thermally curable resin achieving the optical and/or physical properties taught herein. Examples of suitable PT curable resins include (meth)acrylate resins and polysiloxane resins.

In an embodiment of the present invention, the PT curable resin is a PT curable (meth)acrylate resin. Briefly, (meth)acrylates contain a vinyl moiety that may be polymerized through free-radical polymerization to form crosslinked polymers. For example, the polymerization of methyl methacrylate to form poly(methyl methacrylate) is shown below:

(Meth)acrylate monomers may contain more than one (meth)acrylate functional group. Polymerization of such monomers would produce cross-linked resins.

Moreover, the (meth)acrylate monomers may comprise cycloaliphatic groups. Thus, the resin produced would comprise cycloaliphatic groups as side chains or as part of the backbone of the resin. Examples of suitable (meth)acrylate monomers include:

| Exemplary cycloaliphatic (meth)acrylate monomers. | |
|---|---|
| Monomer Structure | Name |
| | Adamantylacrylate |
| | Adamantylmethacrylate |
| | Tricyclo [5.2.1.0] decane dimethanol diacrylate |
| | Tricyclo [5.2.1.0] decane dimethanol dimethacrylate |

In one embodiment of the present invention, the PT curable resin is a PT curable polysiloxane resin. In one aspect of the invention the PT curable polysiloxane resin useful in the fabrication of the optical devices, such as optical devices and coatings, comprises the reaction products of siloxane monomers as shown in Formulae I-III:

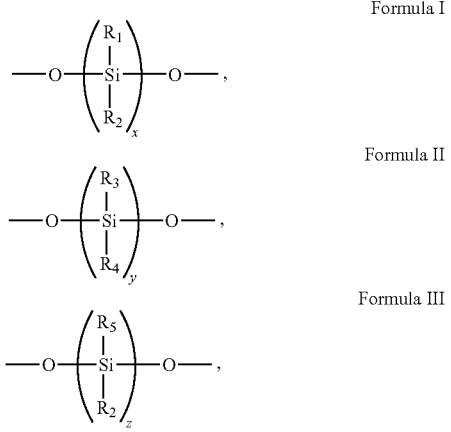

Formula I, Formula II, Formula III wherein x, y and z are mole % or another indication of the relative proportion of these monomers in the resulting PT curable polysiloxane resin and where there must be at least some amount of one of Formula I or Formula III, there must be at least some amount of Formula II, and at least some of the monomers of Formula II include cycloaliphatic groups, in the resulting polysiloxane resin. Indeed, raising the cycloaliphatic content of the PT curable polysiloxane resin, without increasing the epoxy content (or content of other PT curable groups), is believed to be important to the optical properties of the PT curable polysiloxane resin considered herein as useful in producing optical devices with desirable properties. At least about 50% of all siloxane monomers used in the PT curable polysiloxane resins of the invention should include a cycloaliphatic group. It will be appreciated that if certain cycloaliphatic group-containing additives are used to produce cured solid hybrid polymers in accordance with the invention, the cycloaliphatic-containing siloxane content of the PT curable polysiloxane can be less than 50% as long as the total cycloaliphatic content of the hybrid polymer is at least about 15% by weight, or in another embodiment, at least about 20% by weight, or in still another embodiment, about 40% by weight or more. In still another embodiment, the amount of cycloaliphatic groups range from about 18 to about 50% by weight of the hybrid. At least 10% of the silane monomers include a cycloaliphatic group substituted with an epoxy group or other PT curable group. In another embodiment, the content of photo/thermal crosslinking groups (PT curable groups) is at least 20% molar or equivalent content relative to the siloxane content of the resin.

Referring back to the reaction products of siloxane monomers, $R_1$ is an alkoxy group of 1 to 2 carbons in length (methoxy or ethoxy), $R_2$ is a cyclic aliphatic group of 3 to 8 carbons in length, one or more of which carbon atoms may be replaced with a hetero atom selected from the group consisting of O, S, or F, the cyclic aliphatic group being bound to the Si atom through an alkyl bridge of 1 to 6 carbons and being substituted with at least one thermally or photo crosslinkable group (PT curable group) capable of crosslinking upon application of sufficient heat and/or light (either at the UV or other portions of the spectrum) in the presences of an effective amount of a suitable initiator. These PT curable groups include epoxies, vinyl ethers, oxetanes, glycidylethers, acrylates or methacrylates, wherein more than one type of PT curable group may be present in the PT curable polysiloxane resins of the invention; $R_3$ and $R_4$ may be the same or different, and are selected from the group consisting of: (1) an alkyl group of 1 to 6 carbons, the alkyl group being straight or branched, substituted or unsubstituted; (2) a cyclic aliphatic group of 3 to 8 carbons in length, one or more of which carbon atoms can be replaced with a hetero atom selected from the group consisting of O, S, or F, the cyclic aliphatic group being bound to the Si atom directly or through an alkyl bridge of 1 to 6 carbons; (3) an alkoxy group of 1 to carbons with the proviso that only one of $R_3$ and $R_4$ is an alkoxy group; and (4) $R_3$ and $R_4$ can together form a cyclic aliphatic group comprising the Si and 3 to 5 carbons, one of which may be replaced with a heteroatom selected from the group consisting of O or S; and $R_5$ is an alkyl group of 1 to 6 carbons which can be linear or branched.

Optical devices or coatings for optical devices made from these PT curable polysiloxanes are also contemplated.

In one further embodiment, the PT curable polysiloxane resin comprises only siloxane monomers of Formulae I and II (meaning none of Formula III). In another embodiment, the PT curable polysiloxane resin comprises only siloxane monomers of Formulae II and III (meaning none of Formula I). In still another embodiment, the PT curable polysiloxane resin comprises siloxane monomers of Formulae I, II and II. In yet another embodiment, the PT curable polysiloxane resin comprises a plurality of different siloxane monomers of one or more of Formulae I, II and III (e.g. one monomer having the structure of Formula I, two different monomers having the structure of Formula II and one monomer having the structure of Formula III). Optical devices or coatings for optical devices made from these PT curable polysiloxane resins are also contemplated.

At least some of the PT curable polysiloxane resins described herein can be reacted with up to about 40% of a mixture of at least two of the following additives; a hydroxyoxetane, a glycidyl ether, a divinyl ether and/or an alcohol to form a cured solid hybrid polymer having a refractive index of 1.48 or more, an Abbe number of 45 or more, and sufficient fracture toughness. Optical devices and coatings for optical devices made from these materials are also contemplated. It will be appreciated that there are two stages in the formulation of the polysiloxane resins and hybrids of the invention. The first stage is condensation of the alkoxy groups (sol-gel or condensation) where the alkoxy groups of $R_1$ react to form siloxane links. The result of this stage is a viscous transparent resin consisting of functional siloxane oligomers and/or polymers. While this can be thought of as a crosslinking reaction, it is not a reaction involving the PT curable groups. The second stage is the UV photocuring or thermal curing of the epoxy or other PT curable groups. The second stage results in a solid transparent material (i.e. the optical devices). This "resin" is the "functional" (epoxy-functionalized, for example) siloxane polymer. In one embodiment, this second crosslinking step of the functional groups of the polysiloxane resins occurs in the presence of the additives, such as hydroxyoxetane and glycidyl ethers, to form the solid hybrid polymers of the invention.

Looking at Formula I, II and III above, it will also be appreciated that they are provided for illustrative purposes to describe the groups which can be the building blocks of the PT curable polysiloxanes of the present invention. These Formulae are not meant to represent the exact structure or order of the resulting siloxane polymer but rather to describe the content and relative proportions of the monomers therein. Moreover, the actual monomers used would not have exposed oxygens but would be capped with, for example alkyl groups to form alkoxy groups which are removed during the polymerization process.

The PT curable polysiloxanes of the invention may be random copolymers, block copolymers, random-block copolymers and the like. The final order and structure of the PT curable polysiloxane will depend on a number of factors, including the reaction conditions, the relative reaction kinetics of the individual monomers, the relative prevalence or abundance of each monomer, the order of their addition, the number and type of reactive groups on each monitor, and the like.

By way of illustration, consider the following non-limiting examples of short segments of hypothetical PT curable polysiloxanes where: dimethylsiloxane is represented by the letter M, cyclohexylmethyldimethoxysilane is represented by the letter C, trimethoxypropylcyclohexylepoxysilane is represented by the letter T, and dimethoxymethylpropylcyclohexylepoxysilane is represented by the letter D (it will be appreciated that these refer to the actual monomers, methyl groups from the methoxy groups which form the siloxane backbone are dislodged). Consider a siloxane polymer comprised of three moles of T, two moles of D, and five moles of C. Exemplary structures could be represented by: TCDCTCDCTC, TTCDDCCTCC, and TTTDDCCCCC. In another embodiment, consider a PT curable polysiloxane of three moles of M, two moles of C, and five moles of T. Exemplary structures could be represented by: TMTCTMTCTM, TTCMTMMTCT, and TTTTTMMMCC. Finally, a siloxane polymer could be composed of three moles of T, three moles of D, two moles of M, and two moles of C. Exemplary structures could be represented by TTTCCMMDDD, TTTMMDDDCC, DTMCDTMCDT, and DDTMDCCTMT. Depending upon the length of the polymer, the relative portions of the monomers used, the order of their additions and the like, almost any order or repeat is possible throughout the structure. It is noted, however, that the PT curable polysiloxanes of the invention need at least about 10%, and often about 20% or more, of its siloxane monomers necessarily include a PT curable group such as an epoxy substituted cycloaliphatic group and, in some embodiments, at least about 50% of the siloxane monomers should include a cycloaliphatic group (with or without the PT curable group).

Other hypothetical illustrative segments of a PT curable polysiloxane in accordance with the present invention include those of Formulae IV-IX:

Formula IV

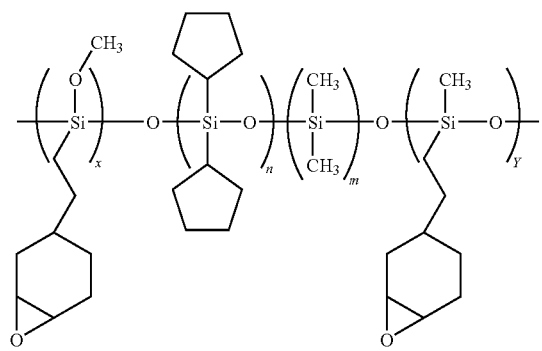

Formula V

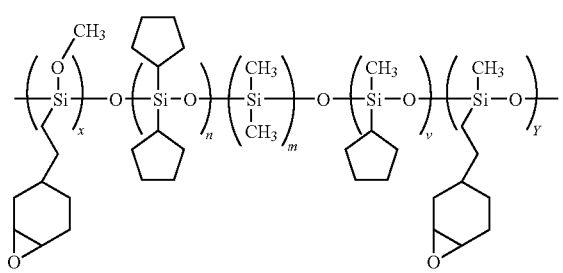

Formula VI

Formula VII

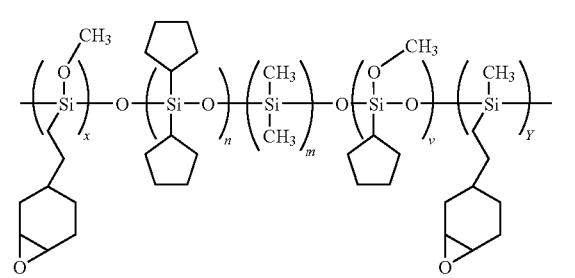

Formula VIII

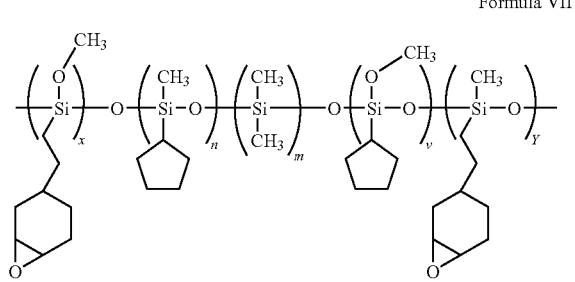

and

Formula IX

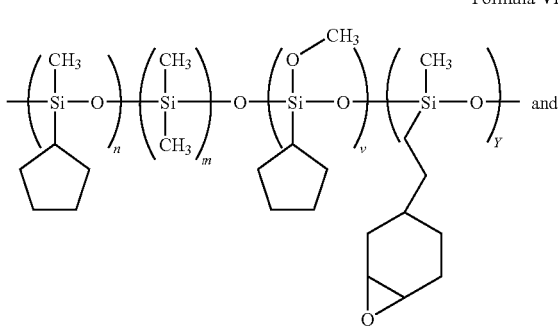

In the segments of Formulae IV-VII, the cycloaliphatic epoxy to the left is of Formula I, the cycloaliphatic epoxy to the right is of Formula III, and two or three groups between them are each of Formula II. Formulae VIII and IX comprise Formulae II and III.

Additional trifunctional cyclic groups of Formula II (wherein one of $R_3$ or $R_4$ is an alkoxy group) that may be used in accordance with the present invention include 2-(Bicycloheptyl)trimethoxysilane, Adamantylethyltrymethoxysilane, Cyclooctyltrimethoxysilane, Cyclopentyltrimethoxysilane (Gelest SIC2557.0), and (Cyclohexylmethyl)trimethoxysilane. Difunctional groups of Formula II that may be used in accordance with the present invention include didyclohexyldimethoxysilane, cyclohexylmethyldimethoxysilane (Gelest SIC2469.0), and (methoxydimethylsilyl)-6-[2-(methoxydimethylsilyl)ethyl]bicycloheptane.

In all of the above illustrations, $R_3$ and $R_4$ of the monomers of Formula II were separate groups on the siloxane monomers. However, $R_3$ and $R_4$ may form a cyclic group that encompasses the silicon in the backbone. Such monomers of Formula II can be used alone or can be substituted for some of the groups of Formula II previously discussed. Consider, for illustration only, the hypothetical PT curable polysiloxane segment of Formula X:

Formula X

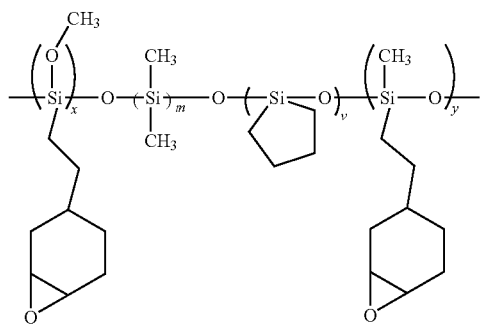

The monomer to the left is of Formula I, the monomer to the right is of Formula III, and both central monomers are of Formula II. Other examples of these aliphatic cyclic monomers of Formula II include: cyclotrimethylenedimethoxysilane, cyclotetramethylenedimethoxysilane, cyclopentamethylenedimethoxysilane, and 2,2-dimethoxy-1-Thia-2-silacyclopentane.

Noncycloaliphatic siloxane monomers of Formula II useful include dimethyldimethoxysilane, diethyldimethoxysilane (Gelest SID3404.0), propylmethyldimethoxysilane, diisopropyldimethoxysilane (Gelest SID3538.0), and diisobutyldimethoxysilane (Gelest SID3530.0). Any combination or mixtures of these are contemplated.

In one embodiment, the amount of dimethylsiloxane of Formula II in the polysiloxane resin is less than about 50% molar fraction relative to the total siloxane content.

It will be appreciated that functional monomers that include a free methoxy or ethoxy group ($R_1$) would result from the use of any of the trifunctional cyclic groups and alkoxy-containing aliphatic epoxy silanes, and these groups are crosslinkable with one another, often during the same processing steps which form the PT curable polysiloxane. However, the epoxy groups, depending upon the chemistry, conditions, and reactants used, can remain free for subsequent reaction.

In some embodiments of the present invention, the PT curable polysiloxane comprises one or more methoxy silane or ethoxy silane groups. (See e.g., Formulas IV-VIII and X above). These groups appear to contribute to the adhesion of the resins to glass silica, and metal oxide substrates in general. Accordingly, such methoxy silane and ethoxy silane-containing PT curable polysiloxane resins are useful in applications where adherence to a glass or metal oxide substrate ($Al_2O_3$, $TiO_2$, CrO, etc.) is desired.

The foregoing discussions separately focused on PT curable (meth)acrylate and polysiloxane resins. However, these photocurable or thermal curable groups may be used together. These photocurable or thermal curable groups may also include other photocurable or thermal curable groups, such as, glycidyl ethers, oxetanes, and vinyl ethers. For example, at least 10%, and in another embodiment, at least about 20%, molar or equivalent content of these PT curable groups relative to the siloxane moiety or acrylate moiety may be present. Acrylates and methacrylates react by a different mechanism (free radical polymerization) than epoxies, oxetanes and vinyl ethers (cationic polymerization), but both types of polymerizations are not exclusive of each other and have been shown in the literature to work together. For example, acrylate and methacrylate polymerizations are inhibited by oxygen and the resins may shrink considerably during cure (>3%). However, poly(meth)acrylate resins are known to have excellent fracture toughness. For these reasons, in some embodiments of the present invention, the relative concentration of (meth)acrylates is less than about 10% of the equivalent SiO concentration.

Polymerization/curing of the PT curable resins requires the presence of a photoinitiator(s) or a thermally activated initiator(s). These initiators are widely known. Typical concentrations of these initiators are between 0.5% to about 2.5% by weight. Cationic polymerization initiators are aryl-iodonium and aryl-sulfonium salts. See Crivello et al. Chemistry of Materials (2001) vol. 13, p. 1932. Free radical polymerization initiators are more diverse (Acetophenone family, benzyl and benzoil compounds family).

The PT curable resins, once cured, have much, if not all, of the desirable optical properties of the invention. This can be assessed by casting a film of this resin and measuring its optical properties by known techniques. In making optical devices, these PT curable resins may be used alone or in combination with conventional additives and cured to form a solid polymer.

One way of manufacturing optical devices in accordance with the invention is replication. Replication involves dispensing a PT curable resin, creating a confined space around the resin to shape the volume occupied by the resin, and introducing an induction agent that transform the resin into a solid optical device that retains the volume/shape. The induction or transforming agent can be light, heat, or a combination of light and heat. Furthermore, the optical device is shaped by confining the resin between a flat surface (the substrate) and another surface (the mold) that can also be flat (to make a film or sheet) or could have complex geometries, such as concave hemispheres, cylinders, rectangular troughs, etc. Typical dimensions of these shapes are between 10 nm (e.g. nanoimprint lithography) on the side to about 100 mm on the side, and from 10 nm in height, to about 5 mm in height. In consumer optics applications, in particular, the devices are between 100 microns on the side to about 10 mm on the side, and their heights are between 10 microns and 2 mm. The devices can be replicated one at a time, or in parallel. In the latter case, one could replicate an array of devices simultaneously on a single substrate (wafer). The wafer can be as small as 25 mm (1") or as large as 300 mm in diameter. Since each device occupies a small area of the wafer, tens to thousands of devices can be manufactured simultaneously on a given wafer. After replication, the stamper tool is removed, and the wafer can be processed to add more devices, on the back side for example, or it can be diced to isolate each individual device. Dicing could be a source of device edge delamination or film fracture Resin materials of both desirable physical and optical properties of the present invention can be formed by blending and reacting the crosslinkable, PT curable resins of the invention with at least two additives selected from the group consisting of a hydroxyoxetane, a glycidyl ether, a divinyl ether and an alcohol. It is known that the addition of these additives individually can provide improved physical properties to certain resins.

For example, when a combination of some of these materials were added to a polysiloxane composed of 70 mole % trimethoxypropylcyclohexyl epoxy silane and 30 mole % of dimethylsiloxane, as well as a polysiloxane of 33 mole % trimethoxypropylcyclohexyl epoxy silane, 33 mole % dimethoxymethylpropylcyclohexyl epoxy silane, and 33 mole % of dimethylsiloxane, they showed significant improvement in terms of their physical properties. In particular, an array of 161 concave lenses each 1.7 mm in diameter and ~150 microns in depth were fabricated on 2" glass wafer by photocuring replication of the resin using an elastomeric mold (PDMS). The wafer was subjected to 30 minutes of annealing at 130° and then returned to room temperature without evidence of delamination or cracking. However, as these crosslinkable siloxanes were not PT curable polysiloxane resins in accordance with the present invention, they did not have the desired level of all of the optical properties previously discussed. The use of a PT curable polysiloxane resin of the invention is expected to provide both the preferred optical properties, and the desirable physical properties realized above. Moreover, there was no reason to expect that the combination of these two materials would prove superior to the use of equal amounts of either.

Fracture toughness is the critical stress intensity $K_c$ at which a material cracks. Stress intensity K is defined as $K=\sigma\sqrt{c}$ where $\sigma$ is the stress and c is the crack length. The strength of the material $\sigma_{break}$ is related to fracture toughness by $\sigma_{break}=K_c/\sqrt{(\pi c)}$. Materials with $K_c<3$ MPa m$^{1/2}$ are generally considered brittle (ice $K_c\sim0.1$ MPa m$^{1/2}$, Epoxies $K_c\sim1$-3 MPa m$^{1/2}$, polystyrene $K_c\sim2$ MPa m$^{1/2}$). Thermoplastics (Nylon, HDPE) are generally tougher ($K_c\sim4$ MPa m$^{1/2}$), and engineering composites are considered "tough" by engineering standards ($K_c>20$ MPa m$^{1/2}$)(see enclosed reference M. F. Ashby, Materials selection in Mechanical Design, Pergamon Press, Oxford 1992.)

As an approximation, fracture toughness scales with strength. Estimated toughness by measuring tensile strengths on dogbones-shaped samples, and integrating the area under the stress-strain curves to account for elongation to failure may be used. Room-temperature values of toughness above 1.49 MPa result in robust optical devices, but below 0.5 MPa typically resulted in material cracking upon thermal cycling.

Since the issue of fracture toughness (4) substrate adhesion (8), and stamper release are closely associated to manufacturability and reliability (reflowability and thermal shock), a better way to quantify these parameters would be to define a set of conditions that the devices must pass without cracking (4) or separating from their substrates (8). These are: A replication process that involves hardening the UV-curable resin between a rigid (glass wafer) substrate and a more flexible releasable mold (stamper), followed by a thermal annealing process (example 30 minutes at 10° C., and more typically 1.49 h. at 130° C.). The stamper wafer (typically 6" diameter or larger) should release from the cured resin (before or after annealing) without causing either the stamper or the cured resin to delaminate or tear from their corresponding wafers (this is requirement 7). In addition, the cured resin should adhere sufficiently well to the substrate to withstand wafer dicing. Finally, both the adhesion to the substrate and fracture toughness of the cured resin should be strong enough to withstand thermal shock and humidity testing, as described by international standards IEC60068-2-14 (1984), IEC60068-2-1 (2007), and IEC60068-2-2 (1974) from the International Electrotechnical Commission, hereby incorporated by reference, without cracking or separating. Accordingly, another way to describe an optical device having sufficient fracture toughness is if it is capable of withstanding replication, wafer dicing and reliability testing and this is what is meant by high fracture toughness.

The amount of the specific additives used to produce the cured solid hybrid polymers of the invention, such as a mixture of a hydroxyoxetane and glycidyl ethers, should not total more than about 40% by weight of the final cured solid hybrid polymer and, in another embodiment, about 1-30% by weight. In still another embodiment, the amount ranges from about 1 to about 20% by weight. The relative proportion of each of these two crosslinkable additives can range from 90:10 to 10:90. In other embodiments, the ratio is about 2:1 to about 1:2, and in still another embodiment, about 1:1.

The selection of the materials for copolymerization with the resins of the invention are important to the resulting properties. A non-hydroxy substituted oxetane would be less successful (although its use in combination with a separate alcohol is contemplated and might be successful). Amine substituted oxetanes are not compatible with cationic photoinitiation.

Hydroxyoxetanes useful in accordance with the invention include, without limitation, 3-hydroxymethyloxetans of the structure

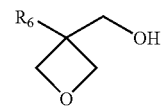

where $R_6$ can be a linear, branched or cyclic alkyl group or a siloxane. Instead of a hydroxymethyl group, other short chain hydroxy alkyl group of up to 6 carbons may be used and these may be polyols as well. In one particular embodiment, $R_6$ includes cycloaliphatic group(s), which may alone or with other additives, increase the overall cycloaliphatic content of the resulting crosslinked solid hybrid polymer to at least about 15% by weight, in another embodiment, at least about 20% by weight, and in another embodiment, about 40% by weight or more.

Glycidyl ethers that may be used in accordance with the present invention may include, without limitation, diglycidyl ethers of the following formula:

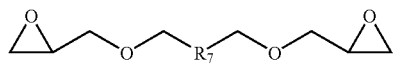

where $R_7$ can be or include a linear alkyl, branched alkyl, or cycloalkyl group, poly-ethylene glycol, mono alcohol or polyol, or a siloxane. Again, in one particular embodiment, $R_7$ is or includes one or more cycloaliphatic group to increase the overall cycloaliphatic content of the resulting crosslinked solid hybrid resin. Indeed, in one embodiment, the content of the cycloaliphatic group found in the PT curable polysiloxane resin of the invention may be reduced to less than 50% if $R_6$ and/or $R_7$, alone or with other additives, include sufficient cycloaliphatic groups such that the cycloaliphatic content of the hybrid polymer is at least about 15% by weight, in another embodiment, at least about 20% by weight, and in another embodiment, about 40% by weight or more.

Examples of digycicyl ethers useful in accordance with the invention are:

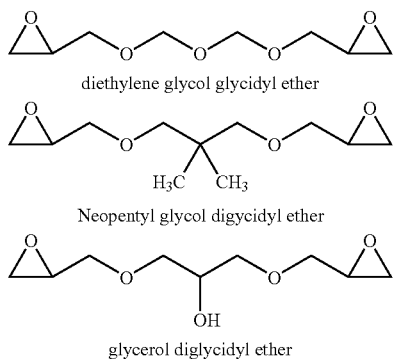

diethylene glycol glycidyl ether

Neopentyl glycol digycidyl ether glycerol diglycidyl ether

Divinyl ethers of the formula:

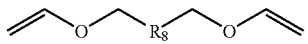

where $R_8$ can be a linear, branched or cycloaliphatic alkyl groups, or siloxanes may also be used as one of the two additives. Examples of divinyl ethers:

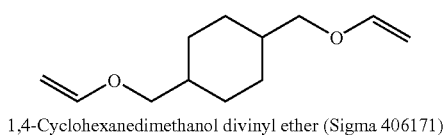

1,4-Cyclohexanedimethanol divinyl ether (Sigma 406171)

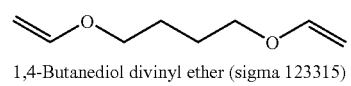

1,4-Butanediol divinyl ether (sigma 123315)

Again, $R_8$ may include cycloaliphatic groups which can reduce the amount of such groups necessary in the PT curable polysiloxane as described herein.

Alcohols that may be used as one of the two additives may include those with the general formula

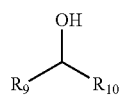

where $R_9$ and $R_{10}$ can be H, alkyl, branched alkyl, or cycloalkyl groups, poly-ethylene glycol or siloxanes. $R_9$ and $R_{10}$ can also contain additional alcohol functional groups, to form dialcohols, or polyols, including polyvinyl alcohol.

Preferred alcohols are dialcohols and polyols. An example of a suitable polyol useful as an additive in the present invention include tricyclodecane dimethanol (TCDA-OH)

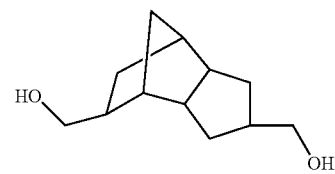

and derivatives thereof. These polycyclic polyols have the additional advantage of also containing a cycloaliphatic group. An example of a TCDA-OH derivative useful in the present invention is the product of the reaction of TCDA-OH and a glycidyl ether epoxy:

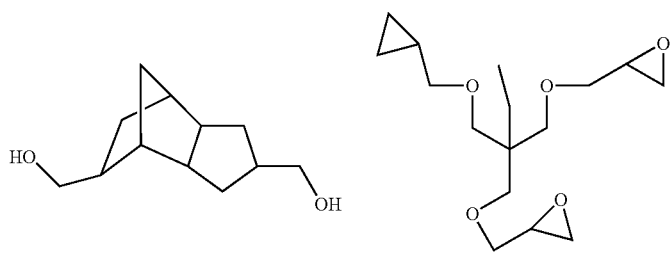

Polymer Bound Acid Catalyst

-continued

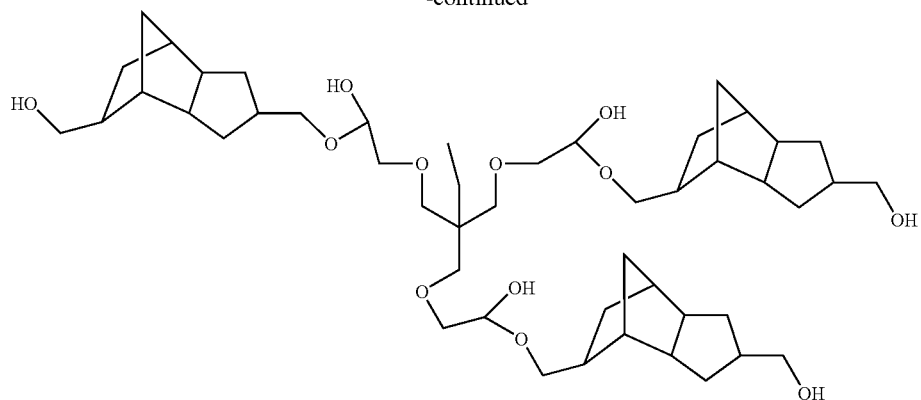

The resulting polycyclic polyol compound is both a polyol and contains multiple cycloaliphatic groups. Use of this additive produces a PT curable resin that is both tough and has a high $T_g$.

Example 1

The optical properties, i.e. refractive index and Abbe number (dispersion), of linear and branched (meth)acrylate resins were compared to the optical properties of cycloaliphatic (meth)acrylate resins. The table below summarizes the results:

| Monomer Structure | Name | Refractive Index (at 589 nm) | Abbe Number (Vd) |
|---|---|---|---|
| | Trimethyolpropane triacrylate ("TMPTAc") | 1.5115 | 50.2 |
| | Trimethyolpropane trimethacrylate ("TMPTMA") | 1.5121 | 49.5 |
| | 1,4-Butanediol diacrylate ("BDDA") | 1.5075 | 52.6 |
| | 1,4-Butanediol dimethacrylate ("BDDMA") | 1.5117 | 51.0 |

-continued

| Monomer Structure | Name | Refractive Index (at 589 nm) | Abbe Number (Vd) |
|---|---|---|---|
| | Adamantylmethacrylate | 1.5289 | 53.1 ± 1.0 |
| | Tricyclo [5.2.1.0] decane dimethanol diacrylate ("TCDDDA") | 1.5308 | 53.4 ± 0.03 |

In sum, the cycloaliphatic (meth)acrylate resins had both a higher refractive index and a higher Abbe number as compared to the linear and branched (meth)acrylate resins. The cycloaliphatic (meth)acrylate resins had a refractive index greater than 1.525 and an Abbe number greater than 53.

Example 2

The optical properties, i.e. refractive index and Abbe number (dispersion), and $T_g$ of numerous PT curable resins were evaluated as follows. The (meth)acrylate reagents and TATATO were purchased from Aldrich Chemical and used as-received. The thiol reagent (4T) was purchased from Evans Chemetics LP (Waterloo, N.Y.). A typical formulation involved mixing 2 g to 4 g of the desired monomer formulation with 0.5 w/% of photoinitiator, PI (Irgacure 184, purchased from Aldrich). The monomers and the PI were mixed thoroughly using a Flacktek Speedmixer model DAC 150 FVZ-K. typical mixing protocol involved 3 minutes rotation at 2,000 rpm.

The mixed formulation was then poured into a rectangular mold (approximately 3 mm tall, 5 mm wide and 10 mm long). The bottom of the mold consisted of an elastomer gasket attached to a glass slide. After filling the mold with the resin, the mold was caped with a glass slide and the assembly was secured with spring-loaded clamps. The bottom and top surfaces of the mold were transparent to UV light.

Resin curing was achieved with the UV system Asahi Spectra Max 302. A typical protocol involved 90 seconds exposure through the top window using a low intensity setting (usually 1 to 3 mW/cm2), followed by additional 90 second low intensity exposure through the bottom window (the mold was flipped). The intensity of the beam was then adjusted to about 10-15 mW/cm2 and the exposure process was repeated, 90 seconds each side. This two-stage curing protocol was adopted in order to avoid the rapid release of heat and bubble formation.

After the sample was thoroughly UV cured, it was annealed between 130° C.-160° C. on a hot plate for about 30 minutes. Afterwards the cured block was carefully de-molded, and at least two of its faces were ground and polished. Typically, one of the front faces (3 mm×5 mm) and one of the window faces (5 mm×10 mm) were ground and polished. This last step was necessary for measuring the optical properties.

The Abbe numbers and Refractive Indices were measured using an Atago multiwavelength refractometer. The resin block was optically coupled to the flat glass sample holder of the refractometer using a coupling fluid of refractive index higher than that of the block (usually bromonaphthalene). A halogen light source was used in conjunction with narrow band filters to illuminate the polished end of the cured block. The Refractive indices were measured at three wavelengths: L1=489 nm, L2=488 nm, and L3=656 nm at least five times each. The Abbe numbers were computed from the usual equation $Vd=(R1-1)/(R2-R3)$, where R1, R2 and R3 are the refractive indices at L1, L2 and L3 respectively.

Sample bars for determination of the glass transition temperature ($T_g$) and cross-link density were fabricated with a similar molding technique. Glass transitions were determined by a double cantilever technique in a dynamic mechanical analyzer Perkin Elmer DMA 8,000.

As used below, "4T" means pentaerythritol tetrakis (3-mercaptopropionate with a structure of:

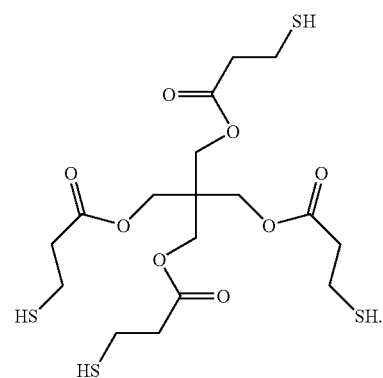

"TATATO" means 1,3,5-triallyl-1,3,5-triazine-2,4,6-trione, which has a structure of:

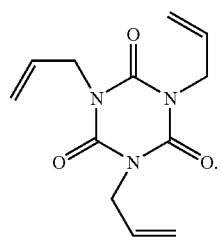

"PMA" means perfluorocyclohexyl methyl acrylate, which has a formula of:

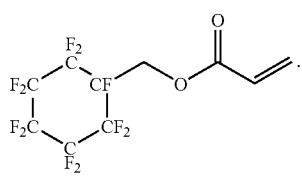

The tables below summarize the results of these evaluations:

| Compound | | $T_g$ | Refractive Index | Abbe Number |
|---|---|---|---|---|
| 4T | TATATO | (° C.) | (at 589 nm) | (Vd) |
| 4.16 g 0.0085 mol | 2.82 g 0.01133 mol | 66 | 1.5638 | 45.0 |

Thiol-ene resin (4T-TATATO).

This resin has a high refractive index, but low Abbe number. Thus, these monomers can be used in conjunction with (meth)acrylates to increase refractive index, but will lower the Abbe number.

| Compound | | | $T_g$ | Refractive Index | Abbe Number |
|---|---|---|---|---|---|
| BDDA | 4T | TATATO | (° C.) | (at 589 nm) | (Vd) |
| 2.64 g 0.0133 mol | 4.16 g 0.0085 mol | 2.83 g 0.0114 mol | 47 | 1.5475 | 46.9 |
| 2.64 g 0.0133 mol | 4.16 g 0.0085 mol | 0 | −20 | 1.5296 | 50.0 |
| 100% | 0 | 0 | 75 | 1.5075 | 52.6 |

Thiol-ene acrylate (4T-TATATO-BDDA).

| Compound | | | $T_g$ | Refractive Index | Abbe Number |
|---|---|---|---|---|---|
| TMPTAc | 4T | TATATO | (° C.) | (at 589 nm) | (Vd) |
| 2.63 g 0.0089 mol | 4.16 g 0.0085 mol | 2.83 g 0.0114 mol | 74 | 1.5498 | 47 ± 0.5 |
| 2.63 g 0.0089 mol | 4.16 g 0.0085 mol | 0 | 1.3 | 1.5362 | 48.3 ± 0.5 |
| 100% | 0 | 0 | >100 | 1.5115 | 50.2 |

Thiol-ene acrylate (4T-TATATO-TMPTAc).

| Compound | | | $T_g$ | Refractive Index | Abbe Number |
|---|---|---|---|---|---|
| BDDMA | 4T | TATATO | (° C.) | (at 589 nm) | (Vd) |
| 3.54 g 0.0156 mol | 4.16 g 0.0085 mol | 2.83 g 0.0114 mol | 58.4 | 1.5411 | 49.0 |
| 3.54 g 0.0156 mol | 4.16 g 0.0085 mol | 0 | −5.2 | 1.529 | 50.4 |
| 100% | 0 | 0 | NA | 1.515 | 51 |

Thiol-ene acrylate (4T-TATATO-BDDMA).

| Compound | | Refractive Index | Abbe Number |
|---|---|---|---|
| 4T | TCDDDA | (at 589 nm) | (Vd) |
| 0.23 g 0.00048 mol | 1.17 g 0.0038 mol | 1.53688 | 52.4 |

Cycloaliphatic acrylate with thiol (4T-TCDDA).

| Compound | | | Refractive Index | Abbe Number |
|---|---|---|---|---|
| 4T | TCDDDA | PMA | (at 589 nm) | (Vd) |
| 0.58 g 0.00119 mol | 2.92 g 0.0096 mol | 1.5 g 0.0041 mol | 1.5034 | 55.3 |

Cycloaliphatic acrylate with thiol and fluoroacrylate (4T-TCDDA-PMA).

In sum the presence of heterocycle (TATATO) and/or thiols (4T) increases refractive index and lowers the Abbe number of (meth)acrylates.

Thus, with the presence of a thiol and fluoroacrylate produces a high Abbe number (greater than 55), but the refractive index is lowered in a cycloaliphatic acrylate.

The data from Examples 1 and 2 (with the exception of $T_g$ data) is presented in the chart below:

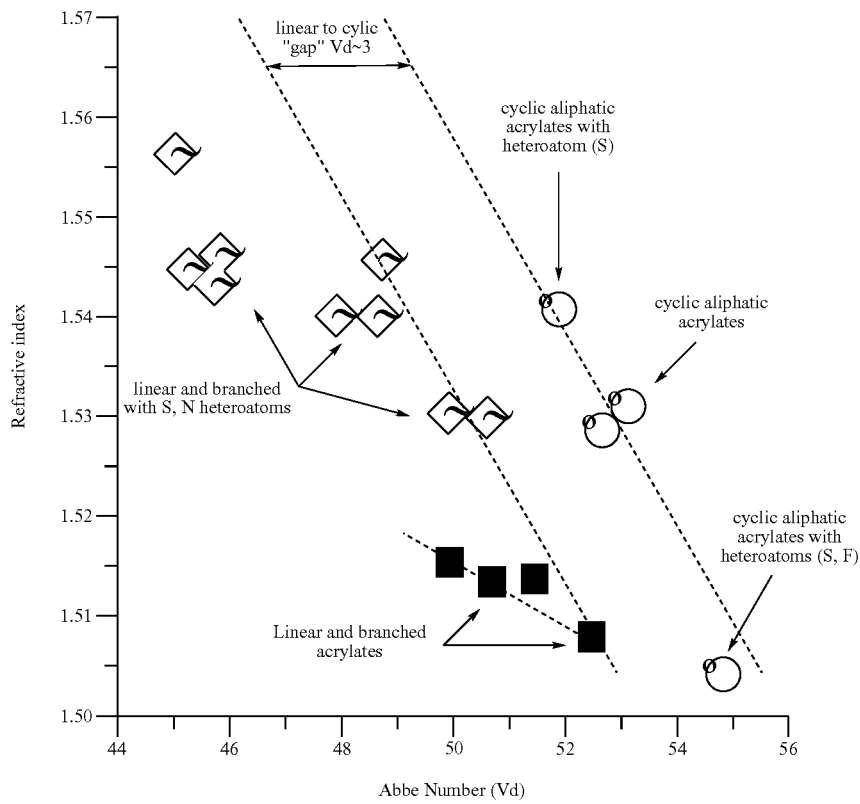

The gap between cycloaliphatic acrylates and non-cyclic acrylates is about 3 Abbe number units. Thus, the use of the cycloaliphatic acrylates produces a significant decrease in optical dispersion over the linear and branched acrylates.

Example 3

In a laboratory equipped with yellow lighting we added 4.5 g of 3-Methyl-3-oxetanemethanol (Prod. No. 277681 from Sigma Aldrich, Milwaukee, Wis.) and 4.5 g of Epoxypropoxypropyl terminated polydimethylsiloxane, 8-11 cSt (Prod. No. DMS-E09 from Gelest, Morrisville, Pa.) to a glass vial and mixed the liquids vigorously for 5 minutes using vortex mixer (Model K-550-g from VWR). Once mixed, the vial was degassed inside a vacuum desiccator to remove trapped air bubbles. In a separate 50 g capacity disposable container (from FlackTek, Landrum, S.C.), we weighed 21 g of the resin PCX-35-67B (epoxycyclohexyl siloxane and diaryliodonium hexafluoroantimonate (photoinitiator) from Polyset Company, Mechanicville, N.Y.), 4.5 g of 1,4-butanediol diglycidyl ether (from Sigma Aldrich, Milwaukee, Wis.), and added the pre-mixed solution 3-Methyl-3-oxetanemethanol and Epoxypropoxypropyl terminated polydimethylsiloxane. We blended the four-component system for 5 minutes at 2400 rpm using a speedmixer (from FlackTek DAC 150 FVZ-K series). The blend, a transparent colorless viscous resin, was labeled TESS-F17 and was stored in the dark.

A two inch (50 mm) diameter stamper containing an array of 261 features (lenses) was fabricated by replicating a Nickel master using a thermally cured elastomeric resin. Each feature (lens) in the master consists in a circular structure approximately 1.6 mm in diameter and 60 microns in depth. The stamper was fabricated by mixing a two-part elastomeric resin according to the manufacturer instructions and degassing the resin under vacuum to remove gas bubbles. Approximately 2 to 3 g of the elastomer resin was poured on a fused silica backplane (approximately 6 inch diameter, 20 mm thick having spacers around its perimeter, approximately 300 microns in height. The Nickel master was carefully placed on top of uncured elastomer, which spread between the two surfaces until the master rested on the spacers separating the master from the glass substrate. The assembly was baked in an oven until the elastomer was cured. Afterwards, the assembly was allowed to cool to room temperature. The Nickel master was carefully removed, leaving behind a replica of its pattern on the elastomer sheet (ca 300 microns thick) still attached to the backplane.

A 2"×3" inch glass 1.2 mm thick glass substrate (Fisher Brand 22-267-013) was thoroughly cleaned using Nanostrip solution for 2 hrs, followed by rinsing with deionized water and air dried. Afterwards the substrate was treated in ECR O2 plasma for 5 minutes (TePla 660). Between 2 and 3 mL of blend TESS-F17 was carefully dispensed on the glass substrate. The stamper was carefully placed on the glass substrate causing the TESS-F17 resin to flow and fill the region between the glass substrate and the backplane. The assembly was placed under the ultraviolet beam of a Mercury Lamp (Omnicure 52000 from Exfo Inc) at 17 mw/cm2 for a total exposure of 2 J/cm2 (2 minutes). Afterwards the stamper was removed from the glass-supported cured TESS-F17 blend. The cured TESS-F17 blend resin exhibited a transparent and colorless replica of the stamper.features (lens array) approximately 300 microns tall. The glass-supported lens array was annealed on a hot plate (Super Nuova digital hot plate from Barnstead Thermolyne) at 135° C. for 30 minutes, and brought to room temperature afterwards. The lens array appeared as a hard transparent, colorless patterned film robustly attached to the glass substrate. The cured TESS-F17 blend resin had a refractive index of 1.496 and an Abbe number of 55.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An optical device comprising a cured solid hybrid polymer comprising the reaction product of
   about 70% by weight of a photocurable and/or thermally curable resin comprising (meth)acrylate or siloxane monomers, at least 50% of which includes at least one cycloaliphatic group;
   an initiator in an amount of between about 0.1 and 2.5% by weight;
   about 15% by weight of a hydroxyoxetane; and
   about 15% by weight of a diglycidyl ether based on the final cured solid hybrid polymer, wherein the optical device has a refractive index of 1.48 or more, an Abbe number of 45 or more, a low cure shrinkage of less than about 3%, and a high fracture toughness.

* * * * *